United States Patent Office 3,422,137
Patented Jan. 14, 1969

---

3,422,137
METHANEHYDROXYDIPHOSPHONIC ACIDS AND SALTS USEFUL IN DETERGENT COMPOSITIONS
Oscar T. Quimby, Cincinnati, Ohio, assignor to The Procter & Gamble Company, Cincinnati, Ohio, a corporation of Ohio
No Drawing. Filed Dec. 28, 1965, Ser. No. 517,073
U.S. Cl. 260—502.4                  10 Claims
Int. Cl. C07f 9/38

---

ABSTRACT OF THE DISCLOSURE

A class of diphosphonate compounds which are methylenehydroxydiphosphonic acid and alkali metal and ammonium salts thereof. The acid is prepared by reacting phosgene and an alkali metal dialkyl phosphite, and water washing and hydrolyzing the reaction product.

---

This invention relates to novel diphosphonate compounds and to their uses, as well as a process for preparing them.

More especially, this invention relates to methane hydroxydiphosphonic acid and water soluble salts thereof. It also relates to a process for the preparation of these compounds and to detergent compositions containing them. The compounds also have valuable sequestering properties that make them especially useful as additives to aqueous solutions for the purpose of sequestering or inactivating the hardness imparting minerals present in the water.

It is an object of the present invention to provide, as a new class of compounds, methanehydroxydisphosphonic acid and water soluble salts thereof and also to describe a process for their preparation. It is another object to disclose detergent compositions containing the new compounds. Yet another object is to provide a process for sequestering hardness imparting minerals present in aqueous solutions. These and other objects will become apparent from a careful reading of the following description of the present invention.

The compounds of the present invention have the following general formula:

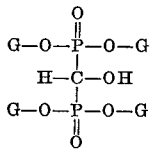

wherein G represents hydrogen, a cation giving a water soluble salt, or a lower alkyl group containing from 1 to about 6 carbon atoms.

In the structural formula presented above, methane hydroxy diphosphonic acid is represented when G is hydrogen. The formula for the acid therefore is $$HCOH(PO_3H_2)_2$$

The cation giving a water soluble salt can be an alkali metal, e.g., sodium, potassium, lithium, etc., ammonium, substituted ammonium such as mono- and diethanol ammonium, and the like. Illustrative and representative compounds are: monosodium methanehydroxydiphosphonate; disodium methanehydroxydisphosphonate; trisodium methanehydroxydiphosphonate; and tetra sodium methanehydroxydiphosphonate. These sodium salts are merely illustrative; the other cations recited above yield corresponding salts.

In the general formula above, the lower alkyl group can be a straight or branch chain saturated aliphatic radicals. Examples include methyl, ethyl, propyl, isopropyl butyl, isobutyl, pentyl, isopentyl, hexyl and isohexyl. Illustrative and representative examples are di(isopropyl) methanehydroxydiphosphonate, and tri(isopropyl) methanehydroxydiphosphonate. The corresponding mono-, di-, tri- and tetra-substituted ester compounds of the balance of the foregoing alkyl groups can also be made.

The compounds of the present invention are prepared by reacting phosgene with an alkali metal dialkyl phosphite at a temperature in the range of from about 0° C. to about 35° C., and preferably from about 10° C. to about 20° C.

Phosgene, $COCl_2$, is carbonyl chloride, and is a gas at room temperature. It has a specific gravity of 1.392; a melting point of −104° C. and a boiling point of 8.2° C. It is slightly soluble in water and slowly hydrolyzed by it. It is soluble in benzene, toluene and other aprotic hydrocarbon solvents.

The metallated diakyl phosphite can be prepared by any ordinary method. Suitable metals include alkali metals such as sodium, potassium, lithium and the like. The alkyl group of the dialkyl phosphite can be any of the previously disclosed ester groups, R, in the general formula above, i.e., a lower alkyl group containing from 1 to about 6 carbon atoms. A preferred compound is sodium diisopropyl phosphite.

The reaction between the phosgene and the alkali metal dialkyl phosphite is rapid and exothermic. It begins almost immediately on contact of the reactants. The reactants will react when mixed in any proportions but according to the present invention it is preferred to operate in a molar ratio of phosgene to dialkyl phosphite of from about 1:1 to about 1:4, and especially preferred is a molar ratio of about 1:2 to 1:3. A stoichimetric ratio for the reaction is 1:3 as seen from the equation (1) below.

(1) 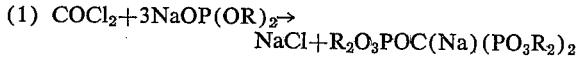

Upon water washing the ester from Reaction (1) protonates, thus:

(2) 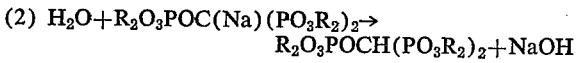

Upon hydrolysis or pyrolysis, two-thirds of the phosphorus in the water washed ester (Equation 2) is recovered as methanehydroxydiphosphonic acid $HC(OH)(PO_3H_2)$, and one third as orthophosphoric acid, $H_3PO_4$ according to the following equation.

(3) 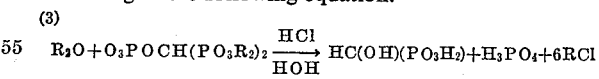

From the reaction product of Equation 3 the RCl passes off as a gas and the methanehydroxydiphosphonic acid is readily separated from the orthophosphoric acid.

As mentioned above, the ester in the reaction product of Equation 2 can also be pyrolyzed to the free methanehydroxydiphosphonic acid with concurrent elimination of, for example, propylene. This pyrolytic technique is not suitable when the ester employed in Equations 1 and 2 is methyl.

The basic reaction between phosgene and the sodium dialkyl phosphite as mentioned above, requires a temperature in the range of from about 0° C. to about 35° C., and preferably from about 10° C. to about 20° C. Temperatures below about 0° C. can cause excessive precipitation of gelantinous $NaOP(OR)_2$. Temperatures in excess of about 35° C. can cause degradation of the reactants and otherwise offer no advantage. For these reasons, it is preferred to operate in the temperature ranges set forth above, since the reaction is exothermic it may be necessary to provide cooling means for maintaining the temperature in the prescribing ranges.

While the reaction is rapid and needs only to have the reactants mixed together, with stirring, the reaction for high levels of completion requires from about 10 minutes to about 3 hours and preferably from about 30 minutes to about 1 hour.

Adequate stirring is desirable throughout the reaction for it provides good contact between the reactants and ensures a more rapid reaction with higher completeness levels.

Generally the phosgene reactant is in the form of a phosgene solution which can readily be prepared by bubbling $COCl_2$ into an organic solvent having no active hydrogens in the molecule such as toluene, hexane, xylene, benzene, etc. Any such aprotic hydrocarbon solvent can be used which does not react with the alkali metal dialkyl phosphite and yet is a solvent for the phosgene.

In such a solution the phosgene should be used at a concentration of from about 5% to about 30%. It is commercially available as a 12½ percent solution in benzene.

Alternatively, the phosgene can be bubbled directly into a solution of the alkali metal dialkyl phosphite. This requires that special apparatus be used, however, and that other precautions be taken. The preferred route is to use the phosgene solutions as described above.

Referring to Equation 1 above, it will be seen that the reaction product contains an intermediate in the preparation of methanehydroxydiphosphonic acid. It is a phosphatediphosphonate ester product which on hydrolysis yields the free methanehydroxydiphosphonic acid. This intermediate reaction product is formed regardless of whether the molar ratio of phosgene to metallated dialkylphosphite is 1:2 or 1:3. It is obtained exclusively when the molar ratio is 1:3 or stoichiometry.

The following example illustrates the foregoing description and a preferred mode of operation according to the present invention.

EXAMPLE

Sodium diisopropyl phosphite was prepared by adding two moles (333.3 grams) of $HPO_3R_2$ to two moles (45.98 grams) of Na, which had been made into a fine dispersion in 150 ml. of toluene. With good stirring and cooling applied as needed to keep the reaction temperature at 15–20° C., the hydrogen diisopropyl phosphite was added dropwise to the sodium dispersion over a period of 30 minutes; after stirring for an additional 30 minutes at 15–20° C. all sodium had dissolved, except for one small lump weighing less than 0.3 gram; this was removed and discarded. (R in the example is isopropyl.)

The phosgene solution was prepared by bubbling $COCl_2$ into 250 ml. of toluene at about 15° C. until a nearly saturated solution containing 80.9 grams (0.818 mole) $COCl_2$ had been obtained. Since solution of the $COCl_2$ was accompanied by evolution of a little heat, some cooling was necessary.

The phosgene solution was cooled to 0° C. and, during a 25 minute period, added dropwise from a 250 ml. dropping funnel to the sodium diisopropyl phosphite with good stirring and with cooling as needed to maintain the contents of the reaction flask at 0 to 10° C. Lower temperatures could not be used without causing excessive precipitation of gelatinous $NaOP(OR)_2$. During addition of the last half of the phosgene, the contents of the reaction flask had the appearance of a milky dispersion and there was some foaming. The reaction mixture became almost clear (slightly yellow) upon standing for 30 minutes.

To complete the addition of a full mole (98.91 grams) of $COCl_2$, another 18 grams of $COCl_2$ was dissolved in 75 ml. of toluene at 0 to 10° C. and the solution added over a 10 minute period to the reaction mixture. The molar ratio of $COCl_2$ to the phosphite was 1:2. Since foaming now became prominent, some of the gas was collected in a rubber bag and examined by mass spectroscopy; this showed overwhelmingly CO plus traces of $CO_2$, and no $COCl_2$. Thus, unless the medium is kept well on the basic side, e.g. by using 3 moles of $NaOP(OR)_2$ per mole of $COCl_2$, there is significant CO evolution.

The desired methanephosphatediphosphonate was recovered in more than the theoretical yield (300 g. vs. 262 g. theo.). This crude ester had a molecular weight of 535, determined by the matched thermistor method.

Hydrolysis of the methanephosphatediphosphonate ester

A 110 gram sample (0.21 mole) of the above crude ester was dissolved in 900 ml. of concentrated aqueous HCL (100% excess) and refluxed for 4.5 hours. The initially clear, slightly yellow solution darkened as the heating progressed and was an opaque black mass at the end of the hydrolysis. After flash evaporation to constant volume, the last trace of HCl was removed by three additions of 50 ml. of isopropanol plus flash evaporation to constant volume after each isopropanol addition. The sample was then decolorized by dissolving in 300 ml. of water, stirring with 5 grams of charcoal (Norite A) for 1 hour and filtering. The resulting water-white solution was diluted to 1500 ml. with methanol and converted to the aniline salt by adding an excess of aniline. The white precipitate, which formed immediately, was removed by filtration and washed first with 500 ml. of acetone, then with 500 ml. of ethyl ether.

The dianiline salt was recrystallized three times from about 70 volumes of a mixed solvent (water/methanol/acetone=10/2/1 by volume). The recovery (77 grams or 0.203 mole) was nearly quantitative. The melting point (244–9° C. uncorrected) did not change significantly during recrystallization. Identity was checked by melting of a 50–50 mixture of this sample with an authentic sample of $HOCH(PO_3H_3An)_2$; no depression of the melting point occurred. Under these conditions then none of the orthophosphate precipitated as the aniline salt and the very first precipitate was practically pure dianiline salt of MHDP.

The aniline salt was dissolved in water and adjusted to pH 7.5 by addition of NaOH solution. After aniline removal by multiple extraction with ether, the solution was ion-exchanged to form the free acid and titrated to a pH of 4.90 to prepare the disodium salt. After two crystallizations from 500 ml. of mixed solvent (water/methanol=4/1 by volume), 17.5 grams of tetrasodium methanehydroxydiphosphonate, $HOCH(PO_3HNa)_2$, was recovered.

It was characterized spectroscopically, by calcium sequestering in the nephelometric caprate test and by elemental analysis.

The $P^{31}$ MR spectrum showed one kind of phosphorus, a doublet at −14.7 p.p.m. on the delta scale (85% $H_3PO_4$=0.0 p.p.m.) with $J_{pH}$=15.5 cps. The proton MR spectrum, besides hydroxyl, only one other kind of protons, namely, a triplet at 5.70 p.p.m. on the tau' scale (external tetramethylsilane taken as 10.0 p.p.m. with J=15.6 cps.

Infrared spectra (both mull and KBr pellet) showed bonded hydroxyl at 3.1 microns and phosphoryl at 8.5 microns.

Nephelometric caprate tests at pH 10 and 25° C. with tetramethylammonium ions instead of sodium gave an efficiency of 27.4 g., ca. per 100 g. of $Na_3H$ salt.

The elemental analysis corrected to the dry basis, using the 1.10% $H_2O$ content found by the Karl Fischer method, is as follows: C, 5.0%, H, 2.3%, P, 25.3%. Theory for $CH_4O_7P_2Na_2$: C, 5.09%; H, 1.71%, P, 26.25%.

By following the general procedure outlined above in the example other water soluble salts and esters of methanehydroxydiphosphonic acid can be prepared.

Methanehydroxydiphosphonic acid is stable in boiling acid solution (5% $HOCH(PO_3H_2)_2$) or boiling base (10% NaOH). Toward hypochlorite under washing conditions it is adequately stable for washing purposes. It has proved easier to crystallize the $Na_2H_2$ salt of methanehydroxydiphosphonic acid from water-methanol mixtures, than either the $Na_3H$ or the $Na_4$ salt. Solubility measurements were made on a sample of the free acid MHDP. After neutralization to the desired composition, the solutions were equilibrated with a crystal phase present for a few days. Clear supernatant was separated by filtration or centrifugation and the weight of dissolved solid determined by drying the supernatant at 140° C. in a vacuum. The solubilities of three sodium salts are tabulated below. It is now easy to see why the $Na_2H_2$ salt proved convenient for purification of MHDP by recrystallization from aqueous media.

Salt—solubility at 80° F., wt. percent: $Na_2H_2$, 10.7; $Na_3H$, 40.8; $Na_4$, 61.0. Note that the solubility at pH 10 ($Na_{3.5}H_{0.5}$ salt) is of the order of 50%.

A sample of the $Na_2H_2$ salt was dried (2 hrs. at 120° C., then cooled in desiccator over $P_2O_5$) and examined in the infrared, both in a coco nitrile mull and in a KBr disc. While hydrate water was still evident in both IR spectra (2.85 and 6.1 microns), so was bonded OH at about 3.1 microns. In addition, the spectrum shows a strong absorption at 8.5 microns, indicating the presence of H-bonded phosphoryl groups. There is also a broad, shallow absorption at 4.25 microns which can not be due to P–H since no wide doublet is seen in the $P^{31}$ or $H^1$ magnetic resonance.

Several samples were examined by nuclear magnetic resonance, both $P^{31}$ and $H^1$ (FIG. 1). The data are given on individual samples in the analytical tables of the appendices.

Another of the surprising discoveries of the present invention is the remarkable detergency building property of the novel diphosphonate compounds of the present invention. The magnitude of the cleaning power and the superior efficiency relative to previously known standard organic and inorganic detergency builder compounds was totally unexpected. As a result of this discovery, one of the more important embodiments of the present invention is a detergent composition which contains a diphosphonate compound described herein as a builder component in the complete detergent formulation.

Built detergent compositions ranging from lightly built to medium built to heavily built have been available for several years. These compositions most generally are in the form of solids and liquids and are used for light, medium, or heavy duty cleaning purposes. The meaning of the terms lightly built, medium built, and heavily built is derived from the relative amount of builder which is present in the total formulation; for instance, a product designed for laundering soiled fabrics. The concept behind built detergent compositions is based on the knowledge that when certain substances are added to the active component or components of detergent compositions, an increase in cleaning ability or whiteness maintenance, or both, is obtained, even though the washing solution used may contain less of the active detergent. Substances capable of producing this improved effect are known as builders, and it is in this context that the diphosphonate compounds of the present invention are especially valuable. Light duty detergent compositions are used for washing fine fabrics or lightly soiled fabrics. Milder conditions are generally used in light duty applications, such as, for instance, cool or warm water and only slight wringing or agitating. Dishwashing compositions can also be considered as light duty detergent compositions. Heavy duty laundering compositions, on the other hand, are those intended for washing heavily soiled fabrics such as are generally found in an ordinary household wash. Medium duty laundering compositions can alternatively be used for dishwashing, fine fabric laundering, or for washing fairly heavily soiled fabrics.

It is surprising that the compounds of the present invention find such broad application in the field of built detergent compositions. It was equally surprising to discover that in formulating detergent compositions described above, the active detergent portion of the complete compositions could be virtually any of the known or commercially available surface active detergent compounds. In its broadest terms, therefore, this embodiment of the present invention contemplates a detergent composition comprising an active detergent portion which can be any surface active compound having useful detergent properties and an effective amount of a builder comprised of the diphosphonate compounds described herein.

It is to be noted that while active detergents or mixtures of detergents are essential components in the built detergent compositions presently being contemplated, the major discovery resides in the useful builder properties of the diphosphonates.

According to the present invention, a detergent composition contains an active detergent and a diphosphonate builder in a ratio, by weight, of from about 5:1 to about 1:10 and, preferably, in a weight ratio of detergent to builder of from 2:1 to about 1:6. It is customary to speak of the ingredients in detergent compositions as being by weight. By way of example, a detergent composition prepared according to the present invention in which the active to builder ratio is about 5:1 or 1:1 on a weight basis is especially useful as a dishwashing composition or a fine fabric laundering composition. A detergent composition having a detergent to builder ratio of 1:1.5 or 1:2 has excellent performance characteristics for washing lightly soiled items in an ordinary household wash. Yet further by way of illustration, heavily soiled fabrics are best laundered with detergent compositions in which the active detergent to builder ratio is from about 1:2 to about 1:10.

It will be seen, therefore, that in practicing the present invention in its simplest terms, it is only necessary to mix at least one surface active detergent compound having the desired sudsing, cleaning, mildness characteristics and the like, with an effective amount of a diphosphonate builder compound in the useful by-weight proportions set forth above.

The active detergent ingredients can include anionic, nonionic, ampholytic and zwitterionic detergent compounds, or mixtures of compounds selected from these general classes of detergents. Each of these classes is illustrated at length as follows:

(A) Anionic soap and non-soap synthetic detergents

This class of detergents includes ordinary alkali metal soaps such as the sodium, potassium, ammonium and alkylolammonium salts of higher fatty acids containing from about 8 to about 24 carbon atoms and preferably from about 10 to about 20 carbon atoms. Suitable fatty acids can be obtained from natural sources such as, for instance, from plant or animal esters (e.g., palm oil, coconut oil, babassu oil, soybean oil, castor oil, tallow, whale and fish oils, grease, lard, and mixtures thereof). The fatty acids also can be synthetically prepared (e.g., by the oxidation of petroleum, or by hydrogenation of carbon monoxide by the Fischer-Tropsch process). Resin acids are suitable such as rosin and those resin acids in tall oil. Naphthenic acids are also suitable. Sodium and potassium soaps can be made by direct saponification of the fats and oils or by the neutralization of the free fatty acids which are prepared in a separate manufacturing process.

Particularly useful are the sodium and potassium salts of the mixtures of fatty acids derived from coconut oil and tallow, i.e., sodium or potassium tallow and coconut soap.

This class of detergents also includes water-soluble salts, particularly the alkali metal salts of organic sulfuric reaction products having in their molecular structure an alkyl radical containing from about 8 to about 22 carbon atoms and a sulfonic acid or sulfuric acid ester radical. (Included in the term alkyl is the alkyl portion of higher acyl radicals.) Examples of this group of synthetic detergents which form a part of the preferred built detergent compositions of the present invention are the sodium or potassium alkyl sulfates, especially those obtained by sulfating the higher alcohols ($C_8$–$C_{18}$ carbon atoms) produced by reducing the glycerides of tallow or coconut oil; sodium or potassium alkyl benzene sulfonates, in which the alkyl group contains from about 9 to about 15 carbon atoms, in straight chain or branched chain configuration, especially those of the type described in U.S. Letters Patents No. 2,220,099 and 2,477,383; sodium alkyl glyceryl ether sulfonates, especially those ethers of higher alcohols derived from tallow and coconut oil; sodium coconut oil fatty acid monoglyceride sulfonates and sulfates; sodium or potassium salts of sulfuric acid esters of the reaction product of one mole of a higher fatty alcohol (e.g., tallow or coconut oil alcohols) and about 1 to 6 moles of ethylene oxide; sodium or potassium salts of alkyl phenol ethylene oxide ether sulfate with about 1 to about 10 units of ethylene oxide per molecule and in which the alkyl radicals contain about 8 to about 12 carbon atoms.

Additional examples of anionic non-soap synthetic detergents which come within the terms of the present invention are the reaction product of fatty acids esterified with isothionic acid and neutralized with sodium hydroxide where, for example, the fatty acids are derived from coconut oil; sodium or potassium salts of fatty acid amide of methyl tauride in which the fatty acids, for example, are derived from coconut oil. Other anionic synthetic detergents of this variety are set forth in U.S. Letters Patents 2,486,921; 2,486,922; and 2,396,278.

Still other anionic synthetic detergents include the class designated as succinamates. This class includes such surface active agents as disodium N-octadecylsulfo succinamate; tetrasodium N-(1,2-dicarboxyethyl)-N-octadecyl-sulfo-succinamate; diamyl ester of sodium sulfosuccinic acid; dihexyl ester of sodium sulfosuccinic acid; dioctyl ester of sodium sulfosuccinic acid.

Anionic phosphate surfactants are also useful in the present invention. These are surface active materials having substantial detergent capability in which the anionic solubilizing group connecting hydrophobic moieties is an oxy acid of phosphorus. The more common solubilizing groups, of course, are —$SO_4H$, —$SO_3H$, and —$CO_2H$. Alkyl phosphate esters such as (R—O)$_2PO_2H$ and $ROPO_3H_2$ in which R represents an alkyl chain containing from about 8 to about 20 carbon atoms are useful.

These esters can be modified by including in the molecule from one to about 40 alkylene oxide units, e.g., ethylene oxide units. Formulae for these modified phosphate anionic detergents are

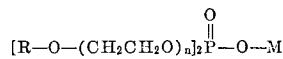

or

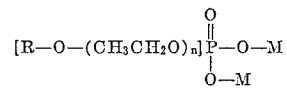

in which R represents an alkyl group containing from about 8 to 20 carbon atoms, or an alkylphenyl group in which the alkyl group contains from about 8 to 20 carbon atoms, and M represents a soluble cation such as hydrogen, sodium, potassium, ammonium or substituted ammonium; and in which $n$ is an integer from 1 to about 40.

A specific anionic detergent which has also been found excellent for use in the present invention is described more fully in the U.S. patent application of Phillip F. Pflaumer and Adriaan Kessler, Ser. No. 423,364 filed Jan. 4, 1965. This detergent comprises by weight from about 30% to about 70% of Component A, from about 20% to about 70% of Component B, and from about 2% to about 15% of Component C, wherein:

(a) Said Component A is a quaternary mixture of double-bond positional isomers of water-soluble salts of alkene-1-sulfonic acids containing from about 10 to about 24 carbon atoms, said mixture of positional isomers including by weight about 10% to about 25% of an alpha-beta unsaturated isomer, about 30% to about 70% of a beta-gamma unsaturated isomer, about 5% to about 25% of a gamma-delta unsaturated isomer, and about 5% to about 10% of a delta-epsilon unsaturated isomer;

(b) Said Component B is a mixture of water-soluble salts of bifunctionally-substituted sulfur-containing saturated aliphatic compounds containing from about 10 to about 24 carbon atoms, the functional units being hydroxy and sulfonate radicals with the sulfonate radical always being on the terminal carbon and the hydroxyl radical being attached to a carbon atom at least two carbon atoms removed from the terminal carbon atoms; and (c) Said Component C is a mixture of water-soluble salts of highly polar saturated alpihatic compounds, each having two sulfur-containing moieties, one of which must be a sulfonate group attached to the terminal carbon atom and the other moiety selected from the group consisting of sulfonate and sulfate radicals attached to a carbon atom at least two carbon atoms removed from the terminal carbon atom, said compounds containing from about 10 to about 24 carbon atoms.

(B) Nonionic synthetic detergents

Nonionic synthetic detergents may be broadly defined as compounds produced by the condensation of alkylene oxide groups (hydrophilic in nature) with an organic hydrophobic compound, which may be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements.

For example, a well known class of nonionic synthetic detergents is made available on the market under the trade name of "Pluronic." These compounds are formed by condensing ethylene oxide with a hydrophobic base formed by the condensation of propylene oxide with propylene glycol. The hydrophobic portion of the molecule which, of course, exhibits water insolubility, has a molecular weight of from about 1500 to 1800. The addition of polyoxyethylene radicals to this hydrophobic portion tends to increase the water solubility of the molecule as a whole and the liquid character of the product is retained up to the point where polyoxyethylene content is about 50% of the total weight of the condensation product.

Other suitable nonionic synthetic detergents include:

(1) The polyethylene oxide condensates of alkyl phenols, e.g., the condensation products of alkyl phenols having an alkyl group containing from about 6 to 12 carbon atoms in either a straight chain or branched chain configuration, with ethylene oxide, the said ethylene oxide being present in amounts equal to 5 to 25 moles of ethylene oxide per mole of alkyl phenol. The alkyl substituent in such compounds may be derived from polymerized propylene, diisobutylene, octene, or nonene, for example.

(2) Those derived from the condensation of ethylene oxide with the product resulting from the reaction of propylene oxide and ethylene diamine. For example, compounds containing from about 40% to about 80% polyoxyethylene by weight and having a molecular weight of from about 5,000 to about 11,000 resulting from the reaction of ethylene oxide groups with a hydrophobic base constituted of the reaction product of ethylene diamine and excess propylene oxide, said base having a molecular weight of the order of 2,500 to 3,000, are satisfactory.

(3) The condensation product of aliphatic alcohols having from 8 to 22 carbon atoms, in either straight chain or branched chain configuration, with ethylene oxide, e.g., a coconut alcohol-ethylene oxide condensate having from 5 to 30 moles of ethylene oxide per mole of coconut alcohol, the coconut alcohol fraction having from 10 to 14 carbon atoms.

(4) Nonionic detergents include nonyl phenol condensed with either about 10 or about 30 moles of ethylene oxide per mole of phenol and the condensation products of coconut alcohol with an average of either about 5.5 or about 15 moles of ethylene oxide per mole of alcohol and the condensation product of about 15 moles of ethylene oxide with one mole of tridecanol.

Other examples include dodecylphenol condensed with 12 moles of ethylene oxide per mole of phenol; dinonylphenol condensed with 15 moles of ethylene oxide per mole of phenol; dodecyl mercaptan condensed with 10 moles of ethylene oxide per mole of mercaptan; bis-(N-2-hydroxyethyl) lauramide; nonyl phenol condensed with 20 moles of ethylene oxide per mole of nonyl phenol; myristyl alcohol condensed with 10 moles of ethylene oxide per mole of myristyl alcohol; lauramide condensed with 15 moles of ethylene oxide per mole of lauramide; and di-isooctylphenol condensed with 15 moles of ethylene oxide.

(5) A detergent having the formula $R^1R^2R^3N \rightarrow O$ (amine oxide detergent) wherein $R^1$ is an alkyl group containing from about 10 to about 28 carbon atoms, from 0 to about 2 hydroxy groups and from 0 to about 5 ether linkages, there being at least one moiety of $R^1$ which is an alkyl group containing from about 10 to about 18 carbon atoms and 0 ether linkages, and each $R^2$ and $R^3$ are selected from the group consisting of alkyl radicals and hydroxyalkyl radicals containing from 1 to about 3 carbon atoms.

Specific examples of amine oxide detergents include:
dimethyldodecylamine oxide
dimethyltetradecylamine oxide
ethylmethyltetradecylamine oxide
cetyldimethylamine oxide
dimethylstearylamine oxide
cetylethylpropylamine oxide
diethyldodecylamine oxide
diethyltetradecylamine oxide
dipropyldodecylamine oxide
bis-(2-hydroxyethyl)dodecylamine oxide
bis-(2-hydroxyethyl)-3-dodecoxy-1-hydroxypropylamine oxide
(2-hydroxypropyl)methyltetradecylamine oxide
dimethyloleylamine oxide
dimethyl-(2-hydroxydodecyl)amine oxide and the corresponding decyl, hexadecyl and octadecyl homologs of the above compounds.

(6) A detergent having the formula $R^1R^2R^3P \rightarrow O$ (phosphine oxide detergent) wherein R' is an alkyl group containing from about 10 to about 28 carbon atoms, from 0 to about 2 hydroxy groups and from 0 to about 5 ether linkages, there being at least one moiety of R' which is an alkyl group containing from about 10 to about 18 carbon atoms and 0 ether linkages, and each of $R^2$ and $R^3$ are selected from the group consisting of alkyl radicals and hydroxyalkyl radicals containing from 1 to about 3 carbon atoms.

Specific examples of the phosphine oxide detergents include:

dimethyldodecylphosphine oxide
dimethyltetrarecylphosphine oxide
ethylmethyltetradecylphosphine oxide
cetyldimethylphosphine oxide
dimethylstearylphosphine oxide
cetylethylpropylphosphine oxide
diethyldodecylphosphine oxide
diethyltetradecylphosphine oxide
dipropyldodecylphosphine oxide
bis-(hydroxymethyl)dodecylphosphine oxide
bis(2-hydroxyethyl)dodecylphosphine oxide
(2-hydroxypropyl(methyltetradecylphosphine oxide
dimethyloleylphosphine oxide, and
dimethyl-(2-hydroxydodecyl)phosphine oxide and the corresponding decyl, hexadecyl, and octadecyl homologs of the above compounds.

(7) A detergent having the formula

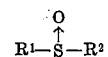

(sulfoxide detergent) wherein $R^1$ is an alkyl radical containing from about 10 to about 28 carbon atoms, from 0 to about 5 ether linkages and from 0 to about 2 hydroxyl substituents at least one moiety of $R^1$ being an alkyl radical containing 0 ether linkages and containing from about 10 to about 18 carbon atoms, and wherein $R^2$ is an alkyl radical containing from 1 to 3 carbon atoms and from one to two hydroxyl groups.

octadecyl methyl sulfoxide
dodecyl methyl sulfoxide
tetradecyl methyl sulfoxide
3-hydroxytridecyl methyl sulfoxide
3-methoxytridecyl methyl sulfoxide
3-hydroxy-4-dodecoxybutyl methyl sulfoxide
octadecyl 2-hydroxyethyl sulfoxide
dodecylethyl sulfoxide (C) Ampholytic synthetic detergents Ampholytic synthetic detergents can be broadly described as derivatives of aliphatic or aliphatic derivatives of heterocyclic secondary and tertiary amines, in which the aliphatic radical may be straight chain or branched and wherein one of the aliphatic substituents contains from about 8 to 18 carbon atoms and at least one contains an anionic water-solubilizing group, e.g., carboxy, sulfo, sulfato, phosphato, or phosphono. Examples of compounds falling within this definition are sodium 3-(dodecylamino)-propionate

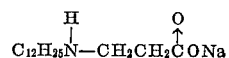

sodium 3-(dodecylamino)propane-1-sulfonate

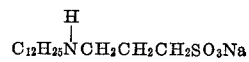

sodium 2-(dodecylamino)ethyl sulfate

sodium 2-(dimethylamino)octadecanoate

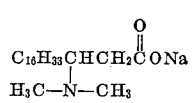

disodium 3-(N-carboxymethyl-dodecylamino)propane-1-sulfonate

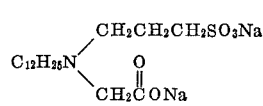

disodium 2-(oleylamino)ethyl phosphate

disodium 3-(N-methyl-hexadecylamino)propyl-1-phosphonate

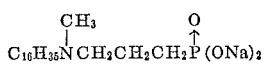

disodium octadecyl-iminodiacetate

sodium 1-carboxymethyl-3-undecyl-imidazole

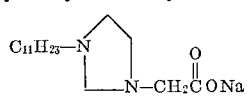

disodium 2-[N-(2-hydroxyethyl)octadecylamino] ethyl phosphate

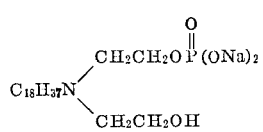

and sodium N,N-bis-(2-hydroxyethyl)-2-sulfato-3-dodecoxypropylamine

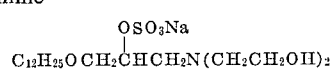

(D) Zwitterionic synthetic detergents

Zwitterionic synthetic detergents can be broadly described as derivatives of aliphatic quaternary ammonium and phosphonium of tertiary sulfonium compounds, in which the cationic atom may be part of a heterocyclic ring, and in which the aliphatic radical may be straight chain or branched, and wherein one of the aliphatic substituents contains from about 8 to 18 carbon atoms, and at least one aliphatic substituent contains an anionic water-solubilizing group, e.g., carboxy, sulfo, sulfato, phosphato, or phosphono. Examples of compounds falling within this definition are 3-(N,N-dimethyl-N-hexadecyl-ammonio)-2-hydroxypropane-1-sulfonate

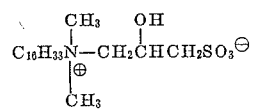

3-(N,N-dimethyl-N-hexadecylammonio)propane - 1 - sulfonate

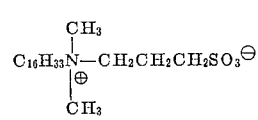

2-(N,N-dimethyl-N-dodecylammonio)acetate

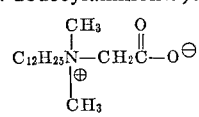

3-(N,N-dimethyl N-dodecylammonio)propionate

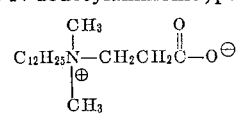

2-(N,N-dimethyl-N-octadecylammonio)-ethyl sulfate

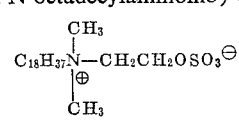

2-(trimethylammonio)ethyl dodecyl-phosphonate

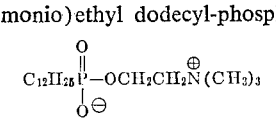

ethyl 3-(N,N-dimethyl-N-dodecylammonio)-propylphosphonate

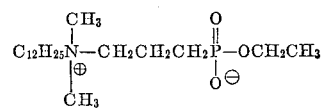

3-(P,P-dimethyl-P-dodecylphosphonio)-propane - 1 - sulfonate

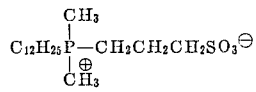

2-(S-methyl-S-tert.-hexadecyl - sulfonio)ethane - 1 - sulfonate

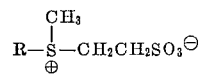

R=tetraisobutylene
3-(S-methyl-S-dodecylsulfonio)-propionate

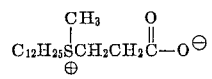

sodium 2-(N,N-dimethyl-N-dodecylammonio)ethyl phosphonate

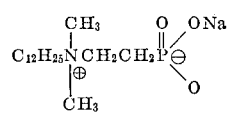

4-(S-methyl-S-tetradecylsulfonio)butyrate

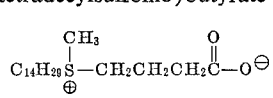

1-(2-hydroxyethyl)-3-undecyl-imidazolium-1-acetate

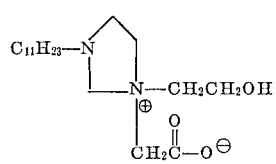

2-(trimethylammonio)-octadecanoate

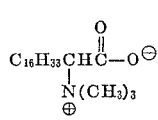

and 3-(N,N-bis-(2-hydroxyethyl)-N-octodecylammonio)-2-hydroxypropane-1-sulfonate.

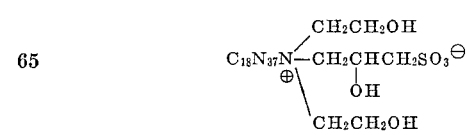

Some of these detergents are described in the following U.S. Patents: 2,129,264; 2,178,353; 2,774,786; 2,813,898; and 2,828,332.

A detergent composition prepared according to the present invention contains as essential ingredients (a) a detergent ingredient and (b) a builder ingredient. In its simplest terms, a composition can contain a single detergent compound and a single builder compound. On the other hand, it frequently is desirable to formulate a detergent composition in which the active detergent portion consists of mixtures of detergent compounds selected from the foregoing classes. Thus, for example, the active ingredient can consist of a mixture of two or more anionic detergents; or a mixture of an anionic detergent and a nonionic detergent; or, by way of another example, the active detergent can be a ternary mixture of two anionic detergents and a zwitterionic detergent.

The part of the complete formulation that functions as a builder can likewise be composed of a mixture of builder compounds. For example, the diphosphonate compounds described herein, e.g., trisodium methanehydroxydiphosphonate, tripotassium methanehydroxydiphosphonate, can be used in admixture with each other or in admixture with other water-soluble organic or inorganic builder salts. For example, trisodium methanehydroxydiphosphonate can be mixed with sodium tripolyphosphate or potassium pyrophosphates in a ratio of 4:1 to 1:4 by weight. Also by way of a preferred example, a binary builder mixture can consist of a trisodium methanehydroxydiphosphonate compound and a water-soluble organic builder salt such as water-soluble salts of nitrilotriacetic acid, ethylenediaminetetraacetic acid, ethane-1-hydroxy-1,1-diphosphonic acid also in a by weight ratio of 4:1 to 1:4. Still further, the builder component of a complete formulation can consist of ternary mixtures of these several types of builder compounds on an equal molar or weight basis.

Water-soluble inorganic alkaline builder salts which can be used in this invention in combination with the novel diphosphonate compounds described herein are alkali metal carbonates, borates, phosphates, condensed polyphosphates, bicarbonates and silicates. Ammonium and substituted ammonium salts of these materials can also be used. Specific examples of suitable salts are sodium tripolyphosphate (mentioned above), sodium carbonate, sodium tetraborate, sodium and potassium pyrophosphate, sodium and ammonium bicarbonate, potassium tripolyphosphate, sodium hexametaphosphate, sodium sesquicarbonate, sodium orthophosphate and potassium bicarbonate.

Examples of water-soluble organic alkaline sequestrant builder salts which can be used in admixture with the diphosphonate compounds of this invention are alkali metal (sodium, potassium, lithium), ammonium or substituted ammonium, aminopolycarboxylates, e.g., the above-mentioned sodium and potassium ethylenediaminetetraacetate, sodium and potassium N-(2-hydroxyethyl)-ethylenediaminetriacetates, sodium and potassium nitrilotriacetates, sodium, potassium and triethanolammonium N-(2-hydroxyethyl)-nitrilodiacetates, and the water-soluble salts of ethane-1-hydroxy-1,1,2-triphosphonic acid and ethane-2-hydroxy-1,1,2-triphosphonic acid. The alkali metal salts of phytic acid, e.g., sodium phytate, are also suitable as organic alkaline sequestrant builder salts. Certain other organic builders which can be used in admixture with the diphosphonates described herein are water-soluble salts of ethylene-1,1-diphosphonic acid, methylene diphosphonic acid, and the like.

The specific action of the builder mixtures of this invention will vary to some extent depending upon the ratio of active detergent to builder mixture in any given detergent composition. There will be considerable variation in the strengths of the washing solutions employed by different housewives, i.e., some housewives may tend to use less or more of the detergent compositions than will others. Moreover, there will be variations in temperature and in soil loads as between washing operations. Further, the degree of hardness of the water used to make up the washing solutions will also bring about apparent differences in the cleaning power and whiteness maintenance results. Finally, different fabrics will respond in somewhat different ways to different detergent compositions. The best type of detergent composition for household use is a composition which accomplishes an excellent cleaning and whiteness maintenance effect under the most diverse cleaning conditions. The built detergent compositions of this invention are especially valuable in this respect.

The builder compounds taught herein are surprisingly efficient. In general, they permit the attainment of excellent washing results with a relatively smaller total quantity of builder in relation to the total quantity of active detergent ingredient than is used in commercially available sodium tripolyphosphate-built detergent compositions.

The built detergent compositions of the present invention can be formulated and prepared into any of the several commercially desirable solid and liquid forms including, for example, granules, flakes, tablets, and water-based and alcohol-based liquid detergents, and the like. According to one embodiment of the present invention, solid detergent compositions are prepared containing an active detergent (sole active or a mixture of detergents) and a builder (single compound or a mixture) in a by weight ratio (detergent to builder) of about 5:1 to about 1:10; and preferably from about 2:1 to about 1:6. A special embodiment of this invention is a liquid detergent composition containing an active detergent and a builder in a by weight ratio (detergent to builder) of 3:1 to about 1:10; preferably 2:1 to about 3:1. The potassium salts of the diphosphonates are especially useful in liquid formulations.

Liquid detergent compositions generally present special problems to the formulator in view of the peculiarities inherent in liquid systems and the special requirements of solubility of the ingredients, and more especially, their physical and chemical stability in such mediums. It is well known, for instance, that sodium tripolyphosphate, which is used commonly in granular compositions, is generally regarded as being unsatisfactory as a sole builder for liquid detergents. It has a marked propensity to hydrolyze to the lower forms of phosphate compounds which are less desirable builders. As a practical matter, therefore, it has been necessary to use a more stable form of a phosphate builder, i.e., pyrophosphate, notwithstanding the fact that the pyrophosphate is a weaker detergency builder than tripolyphosphate. The methanehydroxydiphosphonate compounds of this invention especially solve this particular formulating problem because they are much better builders than tripolyphosphates and, at the same time, are hydrolytically stable. In view of the increasing acceptance by the general public of liquid detergent compositions for virtually all washing and cleaning situations including laundering and dishwashing, it is a very significant contribution of this invention that an improved built liquid detergent product is made possible that will far outperform known liquid detergents while at the same time being free of the troublesome problem of stability.

Built liquid detergents are usually water based or have a mixture of water and alcohol in the liquid vehicle. Such liquid vehicles can be satisfactorily employed in formulating a composition according to the present invention. Accordingly, a sample built liquid detergent composition of this invention can consist essentially of a detergent ingredient (a single detergent or a mixture of detergents) and a methanehydroxy diphosphonate-containing builder ingredient (either as a single builder or in admixture with other builders), with the balance of the composition being a liquid vehicle such as water or a water alcohol mixture, and the like.

The compounds of the present invention have a valuable property which can be of special advantage in the preparation of built liquid detergent compositions. Upon being added to an aqueous solution, even in very small amounts, they almost immediately form a cloudy precipitate with the hardness minerals in the solution, especially the calcium therein. This precipitate effectively inactivates or removes the calcium from the solution while at the same time provides a solution that is cloudy and somewhat milky in appearance. It is well known that there is a substantial proportion of the consumer public that has a decided preference in some applicants, e.g., dishwashing and hard surface cleaners, for a cloudy, thicker, opaque type of liquid detergent. The builder compounds described herein provide this property and thereby offer an alternative to the use of additional ingredients such as opacifiers and the like.

The detergent compositions of the present invention perform at their maximum level in a washing solution which has a pH in the range of from about 8 to about 12. Within this broad range, it is preferred to operate at pH of from about 9.5 to 11. The detergent and the builder can be neutralized to a degree sufficient to insure that this pH prevails in any washing solution. If desired, other alkaline materials can be added to the complete formulation to provide for any necessary pH adjustments. A prefered embodiment is to have the detergent composition whether in solid or liquid form, to provide a pH in the aforementioned ranges at the usual recommended usage levels.

In a finished detergent formulation, there can be present other materials which make the product more effective or more aesthetically attractive. The following are mentioned only by way of example. A water-soluble sodium carboxymethyl cellulose can be added in minor amounts to inhibit soil redeposition or for other reasons. Tarnish inhibitors such as benzotriazole or ethylene thiourea can also be added in amounts up to about 3%. Fluorescers, and brighteners, perfumes, coloring agents, while not per se essential in the compositions of this invention can be added in minor amounts. As already mentioned, an alkaline material or alkali such as sodium or potassium hydroxide can be added as supplementary pH adjusters. Other usual additives includes sodium sulfate, sodium carbonate, water, and the like. Corrosion inhibitors are also frequently used. Water-soluble silicates are highly effective corrosion inhibitors and can be added if desired at levels of from about 3% to about 8% by weight of the total composition. Alkali metal, preferably potassium and sodium silicates, are preferred having a weight ratio of $SiO_2:M_2O$ of from about 1.0:1 to 2.8:1. (M refers to sodium or potassium). Sodium silicate having a ratio of $SiO_2:Na_2O$ of from about 1.6:1 to 2.45:1 is especially preferred.

In the embodiment of this invention which provides for a built liquid detergent, a hydrotropic agent may be found desirable. Siutable hydrotropes are water-soluble alkali metal salts of toluenesulfonate, benzenesulfonate, and xylene sulfonate. Preferred hydrotropes are potassium or sodium toluenesulfonates. The hydrotrope may be added, if desired, at levels of from 0% up to about 12%. While a hydrotrope will not ordinarily be found necessary, it can be added, if so desired, for any reason such as to function as a solubilizing agent and to produce a product which retains its homogeneity at a low temperature.

The following compositions, in which the percentages are by weight, will serve to illustrate, but not limit, the invention. Each of the compositions in the following examples give in solution a pH within the desired range of from about 8 to about 12.

EXAMPLE A

An excellent granular built detergent composition according to this invention has the following formulation:

| | Percent |
|---|---|
| Sodium alkyl benzene sulfonate in which the alkyl is a straight chain dodecyl radical | 18 |
| Trisodium methanehydroxydiphosphonate | 50 |
| Sodium sulfate | 15 |
| Sodium silicate (ratio of $SiO_2:Na_2O$ of 2:1) | 7 |
| Water | 10 |

This heavily built detergent composition is especially valuable for laundering heavily soiled clothes.

The straight chain dodecyl benzene sodium sulfonate in the preceding composition can be replaced on an equal weight basis by either branched chain dodecyl benzene sodium sulfonate, sodium tallow alkyl sulfate, sodium coconut oil alkyl sulfate, sodium olefin sulfonate as described in the specification derived from alpha olefins having an average of 10–18 carbon atoms in the molecule, or a mixture of straight chain dodecyl benzene sodium sulfonate and sodium tallow alkyl sulfate on an equal weight basis. The trisodium methanehydroxydiphosphonate builder can be replaced by other sodium salts of this same builder such as the disodium dihydrogen salt or the tetrasodium salt. It can also be replaced by a 1:1 mixture of sodium tripolyphosphate and tetrasodium methanehydroxy diphosphonate; or a 1:1:1 ternary mixture of sodium tripolyphosphate, sodium nitrilotriacetate and trisodium hydrogen methanehydroxydiphosphonate.

EXAMPLE B

Another granular detergent composition having outstanding cleaning properties has the following formulation:

| | Percent |
|---|---|
| Straight chain dodecyl benzene sodium sulfonate (anionic detergent) | 4 |
| Sodium tallow alkyl sulfate (anionic detergent) | 4 |
| Dodecyl methyl sulfoxide (nonionic detergent) | 2 |
| Hydrogenated marine oil fatty acid | 2 |
| Tetrasodium methanehydroxydiphosphonate | 60 |
| Sodium silicate (ratio of $SiO_2:Na_2O$ of 1.6:1) | 10 |
| Sodium sulfate | 12 |
| Water | 6 |

In this example, the total active detergent of 10% can be totally the nonionic species. In addition, the 2% dodecyl methyl sulfoxide nonionic detergent can be replaced either by an equal weight basis of an alkylphenol ethylene oxide condensate formed by a condensation reaction between dodecyl phenol and 5 moles of ethylene oxide per mole of dodecyl phenol, or by 3-(dodecyldimethylammonio)-2-hydroxy propane-1-sulfonate.

The tetrasodium salt of the diphosphonate builder can be added as the salt or it can be present as the free acid neutralized in situ to correspond to the desired salt form.

EXAMPLE C

This is also an example of a granular detergent composition of outstanding efficiency.

| | Percent |
|---|---|
| Straight chain dodecylbenzene sodium sulfonate [1] (anionic detergent) | 20 |
| Disodium dihydrogen salt of methanehydroxy diphosphonate | 49 |
| Sodium silicate (ratio $SiO_2:Na_2O$ of 2:1) | 6 |
| Sodium sulfate | 14 |
| Water | 11 |

[1] This detergent compound is also referred to as linear dodecyl benzene sodium sulfonate.

In this example the anionic detergent can be replaced on an equal weight percentage with an olefin sodium sulfonate as described above in which the olefin sulfonate consist of a mixture of chain lengths ranging from 10 to about 18 carbon atoms, or a branched chain alkyl benzene sodium sulfonate in which the alkyl is derived from tetrapropylene.

EXAMPLE D

The following formulation is for a granular detergent composition that is an outstanding detergent composition:

| | Percent |
|---|---|
| Dodecyldimethylamine oxide (nonionic detergent) | 16.0 |
| Trisodium monohydrogen methanehydroxy diphosphonate | 40.0 |
| Toluene sulfonate | 1.8 |
| Sodium silicate (ratio of $SiO_2:Na_2O$ of 2:1) | 8.0 |
| Sodium sulfate | 2.0 |
| Diethanolamide of coconut fatty acid | 1.9 |
| Benzotriazole | .02 |

Balance to 100% water.

In this composition, the nonionic detergent can be replaced by tetradecyl dimethyl phosphine oxide, sodium-3-dodecylaminopropionate, sodium - 3 - dodecylaminopropanesulfonate, 3(N,N-dimethyl - N - hexadecylammonio)-propane-1-sulfonate or 3-(N,N-dimethyl - N - dodecylammonio)-2-hydroxypropane-1-sulfonate. Twenty percent of the builder can be replaced with an equal weight replacement of trisodium ethane-1-hydroxyl-1,1-diphosphonate, resulting in a 1:1 by weight ratio.

EXAMPLE E

A liquid detergent which is especially effective in cool water is a heavy-duty detergent and has the following composition:

| | Percent |
|---|---|
| 3-(N,N-dimethyl - N - hexadecylammonio) - 2 - hydroxy-propane-1-sulfonate | 12.0 |
| Tripotassium hydrogen methanehydroxydiphosphonate | 20.0 |
| Sodium silicate (ratio of $SiO_2:Na_2O$ of 1.6:1) | 3.8 |
| Potassium toluenesulfonate | 8.5 |
| Sodium carboxymethyl hydroxymethyl cellulose | .3 |
| Fluorescent dye | .12 |
| Perfume | .15 |
| Benzotriazole | .02 |
| Water | 55.11 |

EXAMPLE F

Another light-duty built liquid detergent which is cloudy in appearance consists of:

| | Percent |
|---|---|
| Sodium salt of sulfuric acid ester of the reaction product of one mole of coconut oil alcohol and 3 moles of ethylene oxide | 11.0 |
| Dodecydimethylamine oxide | 6.0 |
| Sodium tallow alkyl sulfate | 2.25 |
| Tetrapotassium methanehydroxydiphosphonate | 12.0 |
| Potassium toluene sulfonate | 5.5 |
| Water | 63.25 |

This composition is especially suited for dishwashing and fine fabric washing situations.

The following tests demonstrate the outstanding and unexpected superior performance results made possible by the present invention. Built detergent compositions which embody the novel builder compounds described herein provide a level of cleaning which is significantly superior to detergent compositions built with sodium tripolyphosphate and, in most all instances, superior to or comparable to cleaning levels obtained by tetrasodium ethylenediaminetetraacetate. Sodium tripolyphosphate, STP, of course, is a condensed polyphosphate compound that is widely used in commercially available detergent compositions. It is a fairly well recognized standard builder compound. Ethylenediaminetetraacetate, EDTA, is also a well known builder compound. Its value as a builder has been recognized previously, but it has not found general acceptance for such use because, among other reasons, it is too expensive to prepare.

Equally as important and surprising is the increased efficiency of the detergent compositions which employ the diphosphonate compounds of this invention as builders. The increased efficiency is manifested by the fact that even when the compositions of the present invention are used at concentrations far below currently recommended usage levels, equal performance results are obtained. This can be more fully appreciated by a close examination of Table I.

Three different performance characteristics of built detergent compositions were evaluated: cleaning, whiteness, and whiteness maintenance. For purposes of this invention, these terms have the following meanings. The term "cleaning" identifies the ability of a built detergent comopsition to remove soil from soiled fabrics. In part, this applies to the removal of deeply embedded soil deposits such as occurs, for instance, at the collars and cuffs of shirts and blouses. Whiteness is a more general term which identifies or represents a measurement of the ability of a built detergent composition to whiten areas which are only slightly or moderately soiled. Whiteness maintenance is a term which is used to identify the ability of a detergent formulation to prevent the soil which has been removed during a normal washing cycle from being redeposited upon the fabrics during the remainder of the laundering process, e.g., washing and rinsing, etc.

More specifically, the surprising building ability of the diphosphonate compounds of the present invention, using trisodium methanehydroydiphosphonate (MHDP in Table I) as being representative, was discovered by washing naturally soiled white dress shirts with detergent compositions built with different builder materials. Shirts with detachable collars and cuffs were worn by male subjects under ordinary conditions for a certain period of time. The collars and cuffs were then detached and washed in an ordinary agitator type washing machine using solutions of the built detergent compositions being evaluated.

The washed and dried colars and cuffs were graded by means of a visual comparison with other collars and cuffs which had been similarly worn and soiled but which were washed with a standard built detergent composition. The visual comparisons were made by a trained panel of five people who were unfamiliar with any specific details and objectives of the tests. Their judgments were made independently.

Their visual judgments were expressed on a scale ranging from zero to ten. This determination records only the relative cleaning performance grades among the several compositions being evaluated. Zero on the cleaning grade scale represents a cleaning level obtained by washing with water alone, i.e., no detergent formulation. A value of ten represents the cleaning level of a specially formulated standardized detergent composition under optimum conditions. For purposes of this evaluation, a value grade of five represents a level of cleaning that is considered satisfactory in household practice. The test described above employed a detergent composition consisting only of an active detergent compound and a builder compound. For these tests, trisodium methanehydroxydiphosphonate (abbreviated as MHDP in Table I) was used as a representative builder compound coming within the scope of the present invention. Results obtained with this representative material are presented along with results obtained with STP and EDTA in Table I.

Each of the several builder compounds was tested with detergent compounds which are representative of the previously disclosed detergent classes.

In order to obtain as accurate a measurement as possible of the builder property of each of the sample compounds, none of the usual additives, such as sulfates, silicates, fluorescers, anti-redeposition agents, etc., were used in these tests. By limiting the compositions to only two ingredients, i.e., an active detergent and a builder, there could be no interference or masking over of the function of the builders. The concentration of the active detergent in the washing solution was constant at .03% by weight.

The concentrations of the builders in the washing solutions varied as can be seen from Table I.

In addition, the washing solutions containing seven grains per gallon hardness (equivalent $CaCO_3$) were adjusted with NaOH to a pH of 10 or 11 as indicated in the table. The temperatures of the washing solutions were 80° F. or 140° F., also as indicated. The duration of the washing cycle was 10 minutes.

In Table I, a difference in the cleaning grading scale of 1 unit represents a significant difference. By this is meant that an average housewife could readily and consistently see a significant cleaning difference between any two fabrics which have scores separated by a magnitude of at least 1 unit.

From Table I, No. 7 it will be seen that STP at a concentration of .06 gram/100 ml. water scored a grade of 5, which, as previously noted, is a generally acceptable grade for ordinary household usage. At concentrations less than .06, however, it should be noted that the cleaning performance falls off markedly until at concentration of STP of .03 gram/100 ml. of water, STP scored just 1.4 units. EDTA at a concentration of .06%, or .06 gram per 100 ml. water, scored 7.6, significantly better than STP. However, at a concentration of .045 gram/100 ml., EDTA scored only 5.1; and at a concentration of .03 gram per 100 ml., the grading score for EDTA dropped off all the way to .4 unit.

On the other hand, the representative builder compound of the present invention scored above STP on the grading scale Nos. 3, 4, but it also demonstrated marked efficiency in maintaining superior cleaning grades even with lower concentrations, e.g., 03 gram/100 ml. water No. 2. The cleaning superiority over STP at the .06 gram usage level was totally unexpected. The fact that this superiority is maintained at lower usage levels is singularly significant. Thus, at .03% concentration of MHDP, the cleaning grade is more than three cleaning units higher than the cleaning grade obtained with STP at equal concentration. These cleaning grades testify to the outstanding efficiency of the MHDP builder compounds of the present invention over such well recognized builders as STP and EDTA. It is noteworthy also that even as low a concentration of .17 gram/100 ml. of MHDP provides a cleaning level higher than STP and EDTA at a concentration of .03 gram/100 ml. of water.

Equally valuable advantages for MHDP can be noted in the cleaning scores obtained with other detergents, tallow alkyl sulfate and tetradecyl alkyl sulfate as seen from evaluations 11 through 14. At the lower concentration of .03 gram/100 ml., the MHDP performed on a par with STP at .06 gram/100 ml.

Evaluations 15–16 in which a zwitterionic detergent was used as well as evaluations 17–18 wherein a nonionic detergent was used likewise demonstrate the outstanding and efficient cleaning results made possible by the builder compounds of the present invention.

The practical value of the remarkable efficiency of the compounds of the present invention will be readily apparent in situations of insufficient product usage and to formulators of built detergent compositions and especially to those interested in built liquid detergent compositions where special formulating problems are encountered, e.g., solubility, cost, etc.

The collar and cuff samples washed in accordance with the preceding discussion, using the representative detergent and builder compounds, and for which cleaning results are presented in Table I, were thereafter examined for "whiteness" performance results.

The whiteness measurements were made on the backs of the cuffs with a commercially available photoelectric reflectometer, i.e., a Hunter Color and Color Difference meter manufactured by Henry A. Gardner Laboratory, Inc. This instrument is designed to distinguish color differences and operates on the tristimulus colorimeter principle. According to this principle, a 45-degree diffuse reflectance of an incident light beam on a test specimen is measured through a combination of green, blue and amber filters. The electrical circuitry of the instrument is so designed that lightness and chromaticity value for the test specimen are read directly. The departure from white ($TiO_2$) being taken as a standard white) of the test specimen is calculated by introducing the lightness and chromaticity values so obtained into a complex formula supplied by the manufacturer. An evaluation of relative whiteness performance compared to a standard detergent composition is thus obtained for the test formulations and interpolated into a 1-10 scale. A more comprehensive description of this device and its mode of operation appears in Color in Business, Science and Industry by Deane B. Judd, pages 260–262; published by John Wiley & Sons, New York (1952).

The clear performance and efficiency advantages of methanehydroxydiphosphonate compounds discussed above in connection with cleaning were likewise apparent in these "whiteness" measurements. The trisodium methanehydroxydiphosphonate compound offered excellent whiteness results, e.g., always on a parity with STP or significantly superior thereto.

The evaluation of "whiteness maintenance" capability of the respective builders was performed by the following method. Unsoiled swatches of cotton terry cloth were washed with the wash solutions obtained from the cleaning tests. In other words, the unsoiled swatches are added to the "dirty" wash water from the "cleaning" tests. The swatches are dried and then the whiteness thereof is measured by a Hunter Color and Color-Difference Meter following the same procedure described above. The soil adhering to the swatches from the washing solutions containing the aforementioned representative builders. Factors are involved here other than the anti-redeposition characteristics of the built detergent composition. It is, however, one way of demonstrating this property; and for showing relative performance, the test is valuable.

By virtue of these tests, it was ascertained that the methanehydroxydiphosphonate builder compounds of the present invention have very valuable whiteness maintenance properties.

In many industrial, institutional and household processes and products, a small amount of a metal ion contamination present in water may adversely affect color, stability, appearance, quality and saleability of a product or the efficiency of a process. The role of a sequestrant or complexing agent in helping to overcome such adverse effects of metal ions is fairly well recognized and appreciated.

It is another embodiment of the present invention to provide a highly improved process for treating aqueous solutions containing polyvalent metal ions by adding to the solution an effective amount of a methanehydroxydiphosphonate compound. Ordinarily this amount ranges from .25 p.p.m. to 10,000 p.p.m. of the aqueous solution. This aspect of the present invention is based on the discovery of the outstanding sequestering properties of the novel diphosphonate compounds described herein.

The foregoing description of the present invention has been presented describing certain operable and preferred embodiments. It is not intended that the invention should be so limited since variations and modifications thereof will be obvious to those skilled in the art, all of which are within the spirit and scope of this invention.

It has been mentioned previously that the compounds of the present invention in aqueous solution form a calcium salt of low solubility. The resulting solution is milky in appearance. This cloudy precipitation can be substantially avoided, if desired, by using a mixture of the methanehydroxydiphosphonates of the present invention (MHDP) and water soluble salts of ethane-1-hydroxy-1,1-diphosphonic acid (EHDP) in a weight ratio of MHDP to EHDP of from about 2.5:1 to about 1:1.25 and preferably about 1.5:1 to 1:1. Such compositions offer excellent properties as builders in detergent compositions as well as solubilize the MHDP-calcuim precipitates which may otherwise form. The trisodium salts of each of the two ingredients is preferred.

TABLE 1.—CLEANING EVALUATIONS

| Detergent | Builder | Concentration of builder (grams/100 ml. water) | Cleaning grade |
|---|---|---|---|
| 1 Tetrapropylene benzene sulfonate [1]. | MHDP | .017 | 1.5 |
| 2 do [1] | MHDP | .03 | 4.6 |
| 3 do [1] | MHDP | .04 | 5.4 |
| 4 do [1] | MHDP | .06 | 6.2 |
| 5 do [1] | STP | .03 | 1.4 |
| 6 do [1] | STP | .045 | 3.4 |
| 7 do [1] | STP | .06 | 5.0 |
| 8 do [1] | EDTA | .03 | 0.4 |
| 9 do [1] | EDTA | .045 | 5.1 |
| 10 do [1] | EDTA | .06 | 7.6 |
| 11 Tallow Alkyl Sulfate [1]. | MHDP | .03 | 8.5 |
| 12 do [1] | STP | .06 | 9.3 |
| 13 Tetradecyl Alkyl Sulfate.[2] | MHDP | .03 | 6.6 |
| 14 do [2] | STP | .06 | 6.3 |
| 15 3-(Hexadecyl dimethyl ammonio)-propane-1-sulfonate.[2] | MHDP | .03 | 8.2 |
| 16 do [2] | STP | .06 | 7.1 |
| 17 Dodecyl dimethyl phosphine oxide.[2] | MHDP | .03 | 7.3 |
| 18 do [2] | STP | .06 | 6.3 |

[1] Water temperature 140° F., pH 10.
[2] Water temperature 80° F., pH 11.

What is claimed is:
1. A compound of the class consisting of methanehydroxydiphosphonic acid and alkali metal and ammonium salts thereof.
2. Methanehydroxydiphosphonic acid.
3. A sodium salt of methanehydroxydiphosphonic acid.
4. A potassium salt of methanehydroxydiphosphonic acid.
5. A process for preparing methanehydoxydiphosphonic acid which comprises reacting phosgene with an alkali metal dialkyl phosphite at a temperature in the range of from about 0° C. to about 35° C., said dialkyl group consisting of lower alkyl radicals containing from 1 to about 6 carbon atoms to form a reaction product containing a phosphatediphosphonate ester, and thereafter water washing and hydrolyzing said reaction product with aqueous hydrogen chloride.
6. The process of claim 5 in which the molar ratio of said phosgene to said alkali metal dialkyl phosphite is from about 1:2 to about 1:4 and the temperature is in the range of from about 10° C. to about 20° C.
7. The process of claim 5 in which the alkali metal dialkylphosphite in sodium diisopropyl phosphite.
8. The process of claim 5 in which the phosgene is in the form of a solution of phosgene in an organic solvent having no active hydrogen atoms the phosgene being present at a concentration level of about 5% to about 15% by weight.
9. The process of claim 5 in which the reaction is performed for from about 10 minutes to about 3 hours.
10. The process of claim 9 in which the reaction is performed for from about 30 minutes to about 1 hour.

References Cited

UNITED STATES PATENTS 3,159,581  12/1964  Diehl _____ 260—502.4

FOREIGN PATENTS 889,670  2/1962  Great Britain.

OTHER REFERENCES

Kabachnik et al.: "Bull. Acad. Sci., U.S.S.R., Div. Chem. Sci." (English translation), January 1957, pp. 51–56.

LEON ZITVER, *Primary Examiner.*

J. E. EVANS, *Assistant Examiner.*

U.S. Cl. X.R.

260—501.19, 931, 932, 970, 658, 682, 501.21; 252—89; 210—38